United States Patent Office 3,200,845
Patented Aug. 17, 1965

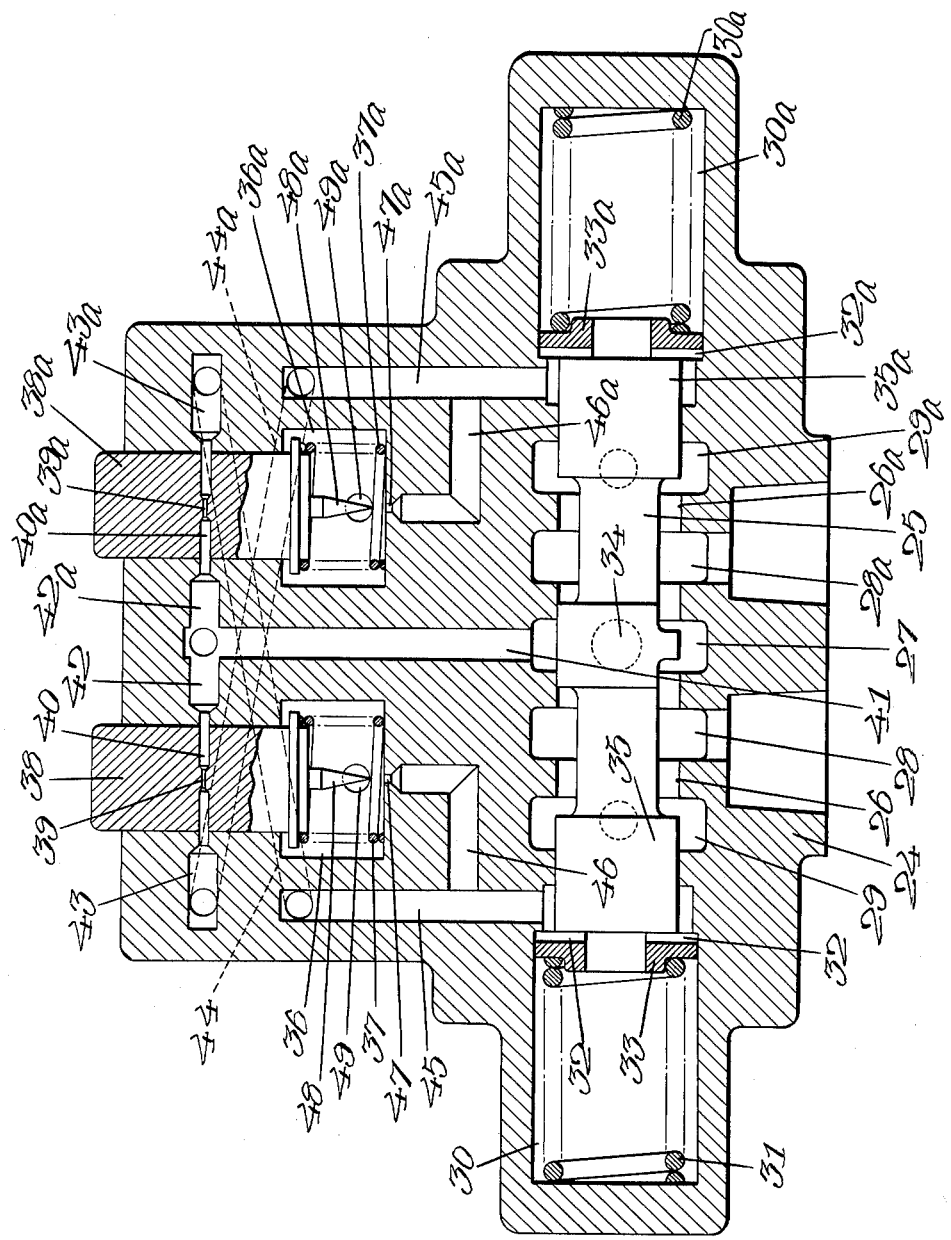

3,200,845
PILOT OPERATED FLUID DIRECTION
CHANGE-OVER VALVE
Masaya Nakazima, Yokohama-shi, and Hiroaki Ishikawa,
Kawasaki-shi, Japan, assignors to Kayaba Industry Co.,
Ltd., Tokyo, Japan, a corporation of Japan
Filed July 16, 1963, Ser. No. 295,469
Claims priority, application Japan, July 18, 1962,
37/29,624
8 Claims. (Cl. 137—625.6)

This invention relates to the valve art and more particularly to control valves of the sliding piston or spool type.

In the prior art, many of the sliding piston type valves utilize lever elements for moving the sliding piston into selected positions to effect certain fluid flow. This particular type of control means has been found to be unsatisfactory in many applications, particularly where the amount of space required for the operation of the lever element is limited. Other conventional types of piston type valves utilize fluid pressure means for positioning the sliding piston which often is controlled by electromechanical means. This type of control means also has been found not to be entirely satisfactory, in that it normally involves a complicated and costly structure.

It, therefore, is the object of this invention to provide an improved valve of the sliding piston or spool type.

Another object of this invention is to provide an improved sliding piston type valve having improved control means for selectively positioning the sliding piston.

A further object of this invention is to provide an improved sliding piston type valve wherein the piston is positioned by fluid pressure applied to the sliding piston, which is controlled by novel control means.

A still further object of this invention is to provide an improved sliding piston type valve having novel control means which eliminates the common disadvantages of the increased space requirements of conventional lever controlled valves and the hazards and complexity of conventional electromechanically controlled valves.

Another object of this invention is to provide an improved sliding piston type valve having a novel control means suitable for selectively changing the direction of a supply of fluid under pressure to a hydraulic cylinder assembly.

A further object of this invention is to provide an improved sliding piston type valve which is simple in construction, easy to operate and inexpensive to manufacture.

Other objects and advantages of the present invention will become more apparent to those persons skilled in the art, in the following description taken in conjunction with the accompanying drawing, wherein:

The drawing is a vertical cross-sectional view of an embodiment of the present invention.

The drawing illustrates an embodiment of the invention wherein a valve body 24 is provided with a cylindrical valve bore 26 to be inserted with a valve piston 25, on the inner circumference of said valve bore 26 being provided a fluid feeding annular groove 27 communicated to the fluid feeding pipe from the pump, and as for instance annular grooves 28, 28a on the front and rear sides of the working cylinder and the fluid discharging annular grooves 29, 29a respectively; end portions of the valve piston 25 inserted into the valve bore 26 are exposed to the working oil pressure chamber 30, 30a provided on the left and right sides of the valve body 24; the both end portions of the valve piston are pushed by the springs 31, 31a provided in said working oil pressure chambers 30, 30a through the spring receivers 33, 33a having longitudinal grooves 32, 32a thereon, thus keeping the valve piston 25 usually at a neutral position. The above description is also applicable to the previous embodiment. Further at this neutral position (position as shown in the drawing), the valve portions 34, 35a which are built in the valve piston 25 are each being opened, and when the valve piston 25 is changed over to the right, the valve portion 34 intercepts the communication of the fluid feeding annular groove 27 and the annular groove 28a, and the valve portion 35 does the same between the annular groove 28 and the fluid discharging annular groove 29 respectively; when the valve piston 25 is changed over to the left, the valve portion 34 intercepts the communication between the fluid feeding annular groove 27 and the annular groove 28, and the valve portion 35a does the same between the annular groove 28a and the fluid discharging annular groove 29a respectively.

The valve body 24 is provided with oil chambers 36, 36a communicated each to the tank; in said oil chambers 36, 36a are inserted push buttons 38, 38a through the springs 37, 37a, and said push buttons 38, 38a are provided with passageways 40, 40a having fluid resistible portions 39, 39a. On the valve body 24 are provided fluid supply passageway 41 communicating with the fluid feeding annular groove 27; said passageway 41 is communicated to the passageways 43, 43a through passageways 42, 40 and 42a, 40a; said passageways 43, 43a are communicated to the reverse side bores 45, 45a through passageways 44, 44a respectively; and said passageways 45, 45a are communicated to the right and left working oil pressure chambers 30, 30a through the longitudinal grooves 32, 32a with said passageways 45, 45a provided respectively on the spring receivers 33, 33a; further discharge passageways 46, 46a are provided in communication with the passageways 45, 45a, on the top of said discharge passageways 46, 46a being provided throttles 47, 47a formed and opened to the oil chambers 36, 36a; the push buttons 38, 38a are fixed with needle valves 48, 48a, the tops of said needle valves 48, 48a are faced to the throttles 47, 47a of the discharge passageways 46, 46a thus forming variable resistible portions 49, 49a.

As a consequence, the oil usually delivered from the pump circulates through the oil feeding annular groove 27, valve bore 26, fluid discharging annular grooves 29, 29a, and tank, while it also circulates through the fluid feeding annular groove 27, passageway 41, passageway 42a, passageways 40, 42a for push buttons 38, 38a, passageways 43, 43a, passageways 45, 45a, discharge passageways 46, 46a, oil chambers 36, 36a, and tank. Now that oil is fed to the left side of the working cylinder, the left side push button 38 may be pushed against the spring 37 and then the needle valve 43 comes closer to the throttle 47 of the discharge passageway 46 and thereby the flow resistance of the variable resisting portion 49 increases, at which moment the passageway 40 intercepts the communication between the passageway 42 and the passageway 43, whereby the pressure in the discharge passageway 46 increases and is transmitted to the working oil pressure chamber 30 through the passageway 45, longitudinal groove 32 of the spring receiver 53, while the pressure in the reverse side working oil pressure chamber 30a reaches zero because the communication of oil to the passageway 45a is intercepted, and the valve passageway 25 moves rapidly to the right against the spring 31a owing to its large pressure difference. Then by the valve portion 34 of the valve piston 25, communication between the fluid feeding annular groove 27 and the annular groove 28a is intercepted and also by the valve portion 35 is intercepted the communication between the annular groove 28 and the fluid feeding annular groove 29 respectively; the oil delivered from the pump is fed to the left side of the working cylinder through the oil feeding annular groove 27, valve bore 26, and annular groove 28, while the oil pushed out of the right side of the working cylinder circulates back to the tank through the annular bore 28a, valve bore 26, and oil discharging annular groove 29a.

Reversely, when the oil is fed to the right side of the working cylinder, the push button 38a on the right side may be pushed, and then similarly as before the pressure in the working oil pressure chamber 30a on the right side increases, while the pressure in the working oil pressure chamber 30 on the reverse side comes to zero, and by the pressure difference of which the valve piston 25 operates to the left side rapidly against the spring 31, feeding the oil delivered from the pump to the right side of the working cylinder through the fluid feeding annular groove 27, valve bore 26, and annular groove 28a, while the oil pushed out of the left side of the working cylinder flows back to the tank through the annular groove 28, valve bore 26, and oil discharging annular groove 29.

What is claimed is:

1. A control valve comprising a valve body having a bore, a valve member slidably mounted in said bore, said body member having fluid supply passageways, each intercommunicating a port communicable with a source of fluid under pressure, and opposite ends of said valve member, said body member having fluid discharge passageways each communicating with one of said fluid supply passageways, first and second independently movable means mounted in said valve body each cooperating with one of said fluid supply passageways and selectively operable for obstructing the cooperating fluid supply passageway and having means operable simultaneously for obstructing the fluid discharge passageway communicating with the other of said fluid supply passageways to permit a pressure increase at one end of said valve member thereby causing a pressure differential across said valve member and responsive movement of said valve member in the direction of the low pressure side thereof.

2. A control valve comprising a valve body having a bore, a valve member slidably mounted in said bore, said member having fluid supply passageways, each intercommunicating a port communicable with a source of fluid under pressure, and opposite ends of said valve member, said body member having fluid discharge passageways each communicating with one of said fluid supply passageways, first and second independently movable means mounted in said valve body cooperating with one of said fluid supply passageways and selectively operable for obstructing the cooperating fluid supply passageway and having means operable simultaneously for progressively restricting the discharge passageway communicating with the other of said fluid supply passageways to permit progressive increase in the pressure at one end of said valve member thereby causing a pressure differential across said valve member and responsive movement of said valve member in the direction of the low pressure side thereof.

3. A control valve comprising a valve body having a bore, said bore having a port communicable with a source of fluid under pressure, said bore having a pair of ports communicable with an object to which fluid under pressure is to be supplied, a valve member slidably mounted in said bore being movable selectively to intercommunicate said port communicable with the source of fluid under pressure and one of said ports communicable with said object, said body member having fluid supply passageways, each intercommunicating said port communicable with the source of fluid under pressure and opposite ends of said valve member, said body member having fluid discharge passageways each communicating with one of said fluid supply passageways, first and second independently movable means mounted in said valve body cooperating with one of said fluid supply passageway and selectively operable for obstructing the cooperating fluid supply passageway and having means operable simultaneously for obstructing the fluid discharge passageway communicating with the other of said fluid supply passageways to permit a pressure increase at one end of said valve member thereby causing a pressure differential across said valve member and responsive movement of said valve member in the direction of the low pressure side thereof whereby said port communicable with the source of fluid under pressure communicates with a port communicable with said object.

4. A control valve comprising a valve body having a bore, said bore having a port communicable with a source of fluid under pressure, said bore having a pair of ports communicable with an object to which fluid under pressure is to be supplied, a valve member slidably mounted in said bore being movable selectively to intercommunicate said port communicable with the source of fluid under pressure and one of said ports communicable with said object, said body member having fluid supply passageways, each intercommunicating said port communicable with a source of fluid under pressure and opposite ends of said valve member, said body member having fluid discharge passageways each communicating with one of said fluid supply passageways, first and second independently movable means mounted in said valve body cooperating with one of said fluid supply passageway and selectively operable for obstructing the cooperating fluid supply passageway and having means operable simultaneously for progressively restricting the fluid discharge passageway communicating with the other of said fluid supply passageways to permit a progressive increase of pressure at one end of said valve member thereby causing a correspondingly increased pressure differential across said valve member and responsive movement of said valve member in the direction of the low pressure side thereof whereby said port communicable with the source of fluid under pressure communicates with a port communicable with said object.

5. A control valve comprising a valve body having a bore, a valve member slidably mounted in said bore, said body member having fluid supply passageways, each intercommunicating a port commuicable with a source of fluid under pressure, and opposite ends of said valve member, said body member having fluid discharge passageways each communicating with one of said fluid supply passageways, first and second independently movable members extending into said valve body each having a fluid passageway normally registered with one of said fluid supply passageways to permit unobstructed flow of fluid in the same fluid supply passageway, each of said movable members being depressible selectively to move said passageway therein out of registry with said one fluid supply passageway to obstruct fluid flow therethrough, each of said movable members having means for obstructing the fluid discharge passageway communicating with the other of said fluid supply passageways when said movable member is depressed to permit a pressure increase at one end of said valve member thereby causing a pressure differential across said valve member and responsive movement of said valve member in the direction of the low pressure side thereof.

6. A control valve comprising a valve body having a bore, a valve member slidably mounted in said bore, said body member having fluid passageways, each intercommunicating a port communicable with a source of fluid under pressure, and opposite ends of said valve member, said body member having fluid discharge passageways each communicating with one of said fluid supply passageways, first and second independently movable members extending into said valve body each having a fluid passageway normally registered with one of said fluid supply passageways to permit unobstructed flow of fluid in the same fluid passageway, each of said movable members being depressible selectively to move said passageway therein out of registry with said one fluid supply passageways to obstruct fluid flow therethrough, each of said movable member having a needle valve cooperating with the fluid discharge passageway communicating with the other of said fluid supply passageways when said movable member is depressed for progressively restricting said fluid discharge passageway to permit a progressively increasing pressure at one end of said valve member thereby causing a corresponding increase of pressure differential across said valve member and responsive movement of said valve member in the direction of the low pressure side thereof.

7. A control valve comprising a valve body having a cylindrical bore, said bore having a first annular groove communicable with a source of fluid under pressure, said bore having second and third annular grooves communicable with an object to which fluid under pressure is to be supplied, a valve spool slidably mounted in said bore being movable to selectively communicate said first groove with one of said second and third grooves, said body member having fluid supply passageways, each communicating with said first annular groove, and opposite ends of said valve spool, said body member having fluid discharge passageways each communicating with one of said fluid supply passageways, first and second independently movable members extending into said valve body each having a fluid passageway normally registered with one of said fluid supply passageways to permit unobstructed flow of fluid in the same fluid supply passageway, each of said movable member being depressible selectively to move said passageway therein out of registry with said one fluid supply passageway to obstruct fluid flow therethrough, said movable member having means for obstructing the fluid discharge passageway communicating with the other of said fluid supply passageways when said movable member is depressed to permit a pressure increase at one end of said valve spool thereby causing a pressure differential across said valve spool and responsive movement of said valve spool in the direction of the low pressure side thereof whereby said first annular groove communicates with one of said second and third grooves.

8. A control valve comprising a valve body having a cylindrical bore, said bore having a first annular groove communicable with a source of fluid under pressure, said bore having second and third annular grooves communicable with an object to which fluid under pressure is to be supplied, a valve spool slidably mounted in said bore being movable to selectively communicate said first groove with one of said second and third grooves, said body member having fluid supply passageways, each communicating with said first annular groove, and opposite ends of said valve spool, said body member having fluid discharge passageways each communicating with one of said fluid supply passageways, each of said fluid discharge passageways having a valve seat, first and second independently movable members extending into said valve body each having a fluid passageway normally registered with one of said fluid supply passageways to permit unobstructed flow of fluid in the same fluid supply passageway, each of said movable member being depressible selectively to move said passageway therein out of registry with said one fluid supply passageway to obstruct fluid flow therethrough, said movable members each having a needle valve engageable with the valve seat in the fluid discharge passageway communicating with the other of said fluid supply passageways when said movable member is depressed to permit an increase of pressure progressively at one end of said valve spool thereby causing an increasing pressure differential across said valve spool and responsive movement of said valve spool in the direction of the low pressure side thereof whereby said first annular groove communicates with one of said second and third grooves.

References Cited by the Examiner
UNITED STATES PATENTS

| | | | |
|---|---|---|---|
| 2,591,800 | 4/52 | Gardiner | 137—625.63 |
| 2,870,789 | 1/59 | Bilaisis | 137—625.6 |
| 2,926,696 | 3/60 | Kolm | 137—625.62 |
| 3,113,590 | 12/63 | Olson | 137—625.6 |

MARTIN P. SCHWADRON, *Acting Primary Examiner.*

M. CARY NELSON, *Examiner.*